Sept. 2, 1969 S. F. HARRIS 3,465,123
MEANS FOR DIRECTING SUPPLY WATER TOWARD THE LOW
TEMPERATURE ZONE OF WATER HEATER
Filed Sept. 2, 1965
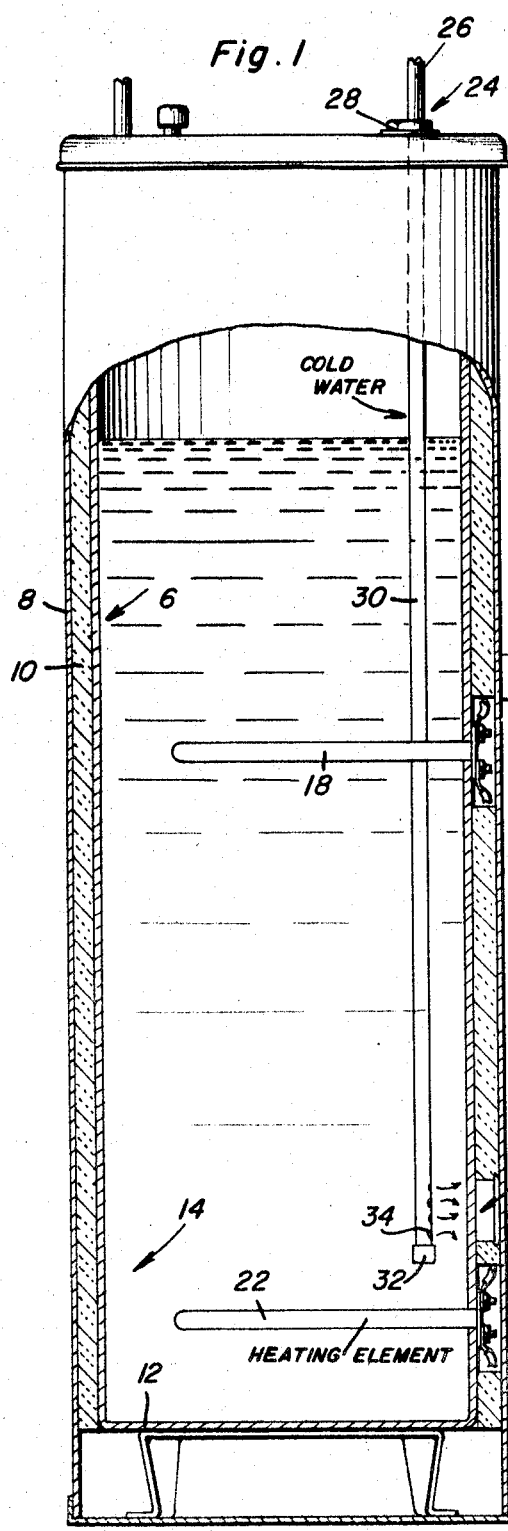
Sidney F. Harris
INVENTOR.

ABSTRACT OF THE DISCLOSURE

United States Patent Office 3,465,123
Patented Sept. 2, 1969

3,465,123
MEANS FOR DIRECTING SUPPLY WATER TOWARD THE LOW TEMPERATURE ZONE OF WATER HEATER
Sidney F. Harris, 1371 N. Christina, Sarnia, Ontario, Canada
Filed Sept. 2, 1965, Ser. No. 484,662
Int. Cl. H05b 3/02
U.S. Cl. 219—328               6 Claims

ABSTRACT OF THE DISCLOSURE

An electric water heater tank having vertically spaced thermostatically controlled immersion heating rods is supplied with cold water that discharges into a bottom portion of the water tank adjacent the lower heating rod and its thermostat so as to produce immediate heating of the water whenever cold water enters the tank upon withdrawal of hot water. In one arrangement, the cold water is discharged from the lower end of a chill pipe directly onto a portion of the tank wall mounting an external thermostat. In other embodiments, the water is discharged from the lower end of a chill pipe directly onto the thermostatically controlled heating rod. The discharge end of the pipe may be enlarged to telescopically receive the rod. In a further embodiment, the thermostat is externally mounted on a portion of the tank wall and an internal baffle box cooperates with the wall portion to form a reception chamber for the cold water.

---

The present invention relates to certain new and useful improvements in an electric-type hot water heater characterized by a water receiving and storing tank of predetermined gallonage and which is provided, in addition to the water temperature control means and the cooperatively adjacent heating element with improved cold water supplying means which greatly improves the interrelated functioning of the control means and heating element and causes the heating element to come on as soon as hot water in the upper portion of the tank is drawn off for usage.

Briefly summarized the disclosure pertains to an insulated tank in which the water to be heated is stored and is adapted to be piped to one's kitchen, bathroom or elsewhere and drawn off for use. At least one (often more than one) electric heating element is operatively mounted and projects into the water storage space of the tank and is automatically switched off and on by a water temperature responsive control means which is manually regulatable and contingent on the temperature of the water in the lower zone of the tank switches the heating element (1) off and (2) on in keeping with the setting of the aforementioned control means. The tank, control means or thermostat, electric heating element may be regarded here, for purposes of introduction as conventional and, as will be hereinafter more particularly set forth, the essence of the invention and accordingly the main function and purpose is to direct and supply the incoming cold water from the city supply or other source so that it is concentrated within the vicinity of the control means and is so focused and arranged that the discharged water plays on the control means so that the heating element is caused to come on as soon as the hot water in the upper portion of the tank is drawn off for usage.

Persons conversant with the field of endeavor herein under consideration are aware that in virtually all electric hot water heaters in common use the lower electric heating element and the oriented and coacting thermostat or equivalent control means or unit are located in such a way that approximately ten gallons of water has to be chilled to a certain low temperature before the thermostat can come on with the result that each time there is but a small draw-off, the heating element fails to come on and finally the water is too low in temperature to complete the needs for domestic household work or requirements. Countless control devices and thermostats are set in the factory where they are made and they are either too high in setting or spaced between the points which allows water temperatures of 180 degrees to cut out and a low temperature water of approximately 80 degrees to cut in. This condition along with other attending matters (which will not be dwelled upon here) has been responsible for a significant loss in business to electrical utility companies and widespread use of automatic clothes washers and appliances have added to the overall problem. Many manufacturers are building larger heaters, using heavy metals all of which adds to the existing problems of thermostatic control and apparently there is no other suitable thermostat that can replace it because of the space and method of attachment without a costly modification in hot water heater constructions. Years of trained experience and operation with utilities in this field reveals that many and varied styles and forms of calibrators for recalibrating and resetting thermostats are in use. At best, if one can calibrate a thermostat to the degree where it will keep the heater from going to steam that at present, or so it seems, is a significant aspect of the overall problem wherein interest seeking to solve the problem is active.

Resorting to further background information it is apparently desired in all hot water heating that the cold water be directed in a manner so that it will not force and chill the hot water in the major upper portion of the storage tank. Certain prior art adaptations which have been taken into account reveal that when hot water is being drawn off the cold water will cascade up through the already heated water and in little or no time the overall tank of water is undesirably chilled. In fact it requires many draw-offs to activate the control means to put the heating element into operation. Therefore, and it may be mentioned here that in carrying out the principles of the present invention it is of significance and importance that the foregoing objectionable practice is overcome for the reason that the cold incoming tank charging water is aimed, concentrated and efficiently handled so that it is not only directed toward the control means but directly coordinates therewith and, in fact, plays thereon so that the control means and the accompanying heating element are brought into play and the overall tankful of water is handled with the degree of efficiency required for best results.

A seemingly recognized critical point in electric hot water heaters, that is those for household use, is approximately 130 degrees cut-in limit. If the control is set to approximately 155 degrees it imposes tension and this is far too hot for the average user and as a matter of fact results in overly high electric bills. A temperature setting of 155 degrees wil not take the cut-in temperature setting of the control means above the critical point of 130 degrees and as a result the control or thermostat will not come on until the temperature of the water is drawn back to approximately 115 degrees and a low in certain cases to 70 degrees. It can be appreciated, therefore, that in prior art constructions where cold water cascades up beyond the control unit, it has to depend on a natural cool-down space of time and on small draw-offs it has no effect on the control unit or thermostat in and around the lower ten gallons of water where said control or thermostat is ordinarily located. The copper and tungsten metals commonly used in the construction of such controls require or need heat to cut out and have to be chilled to cut in. Also heat acting on these particular metals cause them to give up tension and chilling puts tension back into them.

In carrying out this invention the construction and arrangement of parts are such that the adaptation in no way acts as a deterrent to prevailing ways of constructing water heaters or controls which are in current use. It is submitted that the addition of the present invention to the somewhat conventional parts and customary arrangement will be indorsed by manufacturers, plumbers and users and is a definite advance in the art of handling the supply of cold water under pressure to the heatable water storage area of electric water heaters.

A general objective of the present advance in the art is to structurally, functionally and in all other practical ways to improve upon prior art ways and means of introducing and delivering a supply of cold water into the lower portion of the tank chamber and to do so, generally speaking, with a simple chill pipe passing downwardly through the top and the main body of hot water to the bottom area for cooperation with the control means and heating element and, alternatively, to appropriate a similarly performing cold water pipe which enters at the bottom, as distinguished from the top, and which is communicatively connected with unique baffle means coacting with the adjacent lower thermostat and functionally related.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view partly in section and partly in elevation showing a conventional type electric water heater, an upper thermostat and electric heating element at the upper or median portion, a lower control or thermostat and associated heating element in the lower chamber and showing, what is more important, the chill pipe and how the lower end discharges jets of cold water directly onto the wall and the oriented and coordinating thermostat or control which is mounted on said wall.

FIGURE 2 is a fragmentary view in section and elevation which shows a modification (also the lower chamber portion) and which shows the laterally bent apertured end of the chill pipe with orifices discharging cold water onto the adjacent element which, in this instance, may represent a thermostatically controlled electric heating element;

FIGURE 3 is a view similar to FIGURE 2 showing a further modification wherein the discharge end of the chill pipe is enlarged and fashioned in a bell mouth for concentrating the discharge of the cold water so that it plays on a thermostatically controlled electric heating element; and FIGURE 4 is also a view showing a fourth form or modification which is characterized by the aforementioned exteriorly arranged cold water delivery pipe entering the bottom portion of the tank and connected with a louver-equipped hollow box which constitutes simple baffle means for chilling that portion of the metal adjacent the thermostat in the manner shown.

The overall concept is revealed in the embodiment or form of the invention shown in FIG. 1 wherein a somewhat conventional type electric water heater is shown, the same characterized by a vertically elongated storage tank 6 of requisite capacity and enclosed within an outside housing or casing 8 with suitable insulation 10 interposed between the tank and casing. The bottom of the tank is denoted at 12 and it is the area 14 which is of greatest significance in the matter at hand. This is to say, two thermostats or temperature responsive controls are illustrated in this view, the upper one being denoted at 16 and being of appropriate construction and electrically joined to the horizontal upper heating probe or element 18 projecting into the water storage space or chamber.

The invention here has to do primarily with the lower region or area 14 and more particularly with a control unit such as a thermostat 20 appropriately mounted and cooperating with the wall of the tank and electrically connected with the adjacent electric heating element 22 which projects into the water spaces in the manner shown. In carrying out this aspect of the concept a chill pipe 24 is provided, the upper portion 26 being connected with a suitable source of supply (not shown) and then passing through the top of the casing and tank as generally indicated at 28. The portion which is of chief concern here is that part 30 which depends through the charge or supply of water and extends toward and terminates above the bottom wall 12. In fact, the terminal end is capped or suitably closed at 32 and on one side, the side facing the control unit 20, it is provided with vertically spaced orifices 34 which concentrate the discharging jets of chilled water and cause the same to be focused on and directed against the wall portion adjacent the control or thermostat 20. There may be other and equivalent ways whereby this concentration and focusing of discharge water can be caused to impinge on the control unit and activate the same but the method and means herein shown (FIG. 1) is and has been found as a result of experimentation to be satisfactory and an efficient approach.

An alternative construction is that shown in the modification depicted in FIG. 2 wherein the tank is denoted at 36, the jacket or casing at 38 and the intervening insulation at 40. The numeral 42 here may designate a thermostatically controlled water heating electric element or one in which the thermal cut-in and cut-out switch may be incorporated. In any event the chill pipe here is denoted at 44 and has a laterally directed end portion 46 which is in a plane above the space in parallelism to the element 42 and terminates in a closing cap 48. Here again this arrangement is in the lower zone or water area 50 adjacent and above the bottom 52 of the tank 54.

Another approach is that shown in FIG. 3 wherein the bottom 56 of the tank is denoted at 58, wherein the jacket or casing is denoted at 60, the insulation at 62 and the thermostatically controlled heating element at 64. In this arrangement the lower end portion 66 of the chill pipe 68 is provided with an enlarged bell mouth which has telescoping association with the element 64.

In several forms of the invention so far described in detail it will be seen that the chill pipe is within the confines of the water housed in the tank. The arrangement shown in FIGURE 4 is a slightly different approach and here the tank is denoted at 70, the bottom wall at 72, the thermostatically controlled heating element at 74, the jacket or casing at 76. The thermostat or control unit is denoted at 78 and is lined up and mechanically joined to a wall portion of a relatively small baffle member 80 having box portion 82 enclosing a cold water reception chamber 84 with which an end portion 86 of the supply pipe 88 is communicatively connected. The pipe here at 90 is between the tank and wall 92. As hot water is drawn off, cold water enters pipe 90 and is fed into reception chamber 84 and discharges through outlet louvers 94 toward the lower part of tank, the chilling step takes place between thermostat 78 and reception chamber 84 with which it is in contact as shown causing heating element 74 to generate heat for the body of water in the tank.

With the construction and arrangement just covered and illustrated in particular in FIG. 4, it will be observed that the cold water supply is directed against an inner end portion of the lower thermostatically controlled means (thermostat and heating element conjointly) that it chills the surrounding metal that the thermostat is connected to. This chilling step puts the heating element into instant operation and every time hot water is drawn, the incoming cold water is forced from the supply pipe means through the baffle 80 and is discharged in the manner indicated by the arrows to obtain the results desired.

The cold water jets spraying on wall, sends a cold wave through that portion of the wall or tank that thermostat is connected to, in fact, manufactured with. It acts much the same as a sound wave or signal. Once the cold wave is sent, it does not matter how many heat waves follow. The cold wave requires only from 10 to 20 seconds to activate a thermostat. Tests have been carried out in a sufficient number of cases to show above and beyond any doubt in this particular application the use of a chill pipe and baffle assembly. In all other cases observed from test, it requires from three hours to twenty four hours on natural cool down, to activate a thermostat or control, on heaters of 30 gallons or more.

It will be evident that by utilizing or installing either the chill pipe arrangement (FIGS. 1 to 3, inclusive) or the baffle construction and arrangement (FIG. 4) and employing a well balanced thermostat and controls, hot water heaters would be able to use any minute of time available between the peak hours inasmuch as a slight draw-off of water will put the water heater into almost immediate operation.

It is submitted that a careful consideration of the specification in conjunction with the views of the drawing will enable the reader to obtain a clear and comprehensive understanding of the subject matter of the invention, the features and advantages which are deemed to be significant and the manner of use. Accordingly, a more extended description of the details is deemed to be unnecessary.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. In combination with a water heater having a water containing tank, a pair of thermostatically controlled immersion heating rods horizontally mounted within the tank in vertically spaced relation to each other, means for supplying cold water to the tank comprising a feed pipe extending into the tank, lateral discharge means connected to the feed pipe in close vertically spaced relation to a lowermost of said heating rods for establishing a low temperature zone to which only the lowermost of the heating rods is exposed during discharge of cold water into the tank, a pair of thermostat sensing devices connected to said heating rods, one of said devices being mounted externally of the tank adjacent the uppermost of the heating rods, the other of said devices being mounted on a portion of the tank in heat conductive relation to the low temperature zone adjacent the lowermost of the heating rods, said other of the sensing devices being substantially vertically aligned with the lateral discharge means, said lateral discharge means comprising a baffle box mounted internally on the tank and together with said portion of said tank enclosing a chamber connected to the feed pipe, said portion being in direct heat conductive relation to the other of the sensing devices, and outlet means mounted by the box in spaced relation to the feed pipe for directing cold water from the chamber away from said portion of the tank toward the lowermost of the heating rods.

2. The combination of claim 1 wherein said feed pipe enters the tank at a location below the lowermost of the heating rods and extends upwardly therefrom to the lateral discharge means.

3. In combination with a water heater having a water containing tank, a pair of thermostatically controlled immersion heating rods horizontally mounted within the tank in vertically spaced relation to each other, means for supplying cold water to the tank comprising a feed pipe extending into the tank, lateral discharge means connected to the feed pipe in close vertically spaced relation to a lowermost of said heating rods for establishing a low temperature zone to which only the lowermost of the heating rods is exposed during discharge of cold water into the tank, said feed pipe entering the tank at a location below the lowermost of the heating rods and extending upwardly therefrom to the lateral discharge means, said lateral discharge means receiving the cold water in contact with a portion of the tank, and a pair of thermostat sensing devices connected to said heating rods, one of said devices being mounted externally of the tank adjacent the uppermost of the heating rods, the other of said devices being mounted externally on said portion of the tank in direct heat conductive relation thereto.

4. The combination of claim 3 wherein said other of the sensing devices is substantially vertically aligned with the lateral discharge means.

5. In combination with a water heater having a water containing tank, a pair of thermostatically controlled immersion heating rods horizontally mounted within the tank in vertically spaced relation to each other, means for supplying cold water to the tank comprising a feed pipe extending into the tank, lateral discharge means connected to the feed pipe in close vertically spaced relation to a lowermost of said heating rods for establishing a low temperature zone to which only the lowermost of the heating rods is exposed during discharge of cold water into the tank, a thermostatic sensing device located adjacent to the lowermost of the heating rods, said lateral discharge means comprising a baffle box mounted internally of the tank and together with a portion of the tank enclosing a chamber connected to the feed pipe, said portion being in direct heat conductive relation to the sensing device, and outlet means mounted by the box in spaced relation to the feed pipe for directing cold water from the chamber away from said sensing device toward the lowermost of the heating rods.

6. In combination with a water heater having a water containing tank, an immersion heating element mounted within a lowermost portion of the tank and a thermostatic sensing device mounted externally on a portion of the tank closely spaced from the heating element, means for supplying cold water to the tank comprising a feed pipe extending into the tank, a baffle box connected to the feed pipe and mounted within the tank, said portion of the tank being in direct heat conductive relation to the sensing device, said baffle box together with said portion of the tank enclosing a reception chamber having outlet means spaced from the feed pipe for directing cold water away from the sensing device toward the heating element.

References Cited

UNITED STATES PATENTS

| | | | |
|---|---|---|---|
| 1,442,048 | 1/1923 | Christian | 219—314 |
| 1,864,887 | 6/1932 | Bodenstab | 219—331 X |
| 2,013,914 | 9/1935 | Hartman | 219—331 X |
| 2,051,657 | 8/1936 | Stiebel | 219—328 X |
| 2,592,863 | 4/1952 | Conner | 122—13 |
| 2,711,472 | 6/1955 | Bowen | 219—314 |
| 2,894,109 | 7/1959 | Kendon | 219—312 |
| 3,282,468 | 11/1966 | Karlen | 219—314 X |
| 1,799,951 | 4/1931 | Bros et al. | 219—331 X |
| 2,213,464 | 9/1940 | Fogwell | 219—312 X |
| 2,712,052 | 6/1955 | Buehne | 219—316 |
| 2,809,267 | 10/1957 | Schauer | 219—312 X |

FOREIGN PATENTS

| | | |
|---|---|---|
| 565,603 | 11/1944 | Great Britain. |
| 995,975 | 6/1965 | Great Britain. |

ANTHONY BARTIS, Primary Examiner

U.S. Cl. X.R.

122—13; 126—361; 219—312, 331